US00RE39338E

(19) United States
(12) Reissued Patent
Stratford

(10) Patent Number: US RE39,338 E
(45) Date of Reissued Patent: Oct. 17, 2006

(54) LAWN MOWER

(75) Inventor: Mark Stratford, Darlington (GB)

(73) Assignee: Black & Decker Inc., Newark, DE (US)

(21) Appl. No.: 29/174,139

(22) Filed: Jan. 10, 2003

Related U.S. Patent Documents

Reissue of:
(64) Patent No.: Des. 458,277
Issued: Jun. 4, 2002
Appl. No.: 29/110,783
Filed: Sep. 14, 1999

(30) Foreign Application Priority Data

Mar. 18, 1999 (GB) ..... 2082100
Mar. 18, 1999 (GB) ..... 2082101

(51) LOC (8) Cl. ..... 15-03
(52) U.S. Cl. ..... D15/14
(58) Field of Classification Search ..... D15/10, D15/14–18, 28; 56/194, 201, 202, 16.6, 16.7, 56/17.1, 17.4, 255, 10.5, 10.1, 14.7, 320.2, 56/320.1, DIG. 9
See application file for complete search history.

(56) References Cited

U.S. PATENT DOCUMENTS

D346,810 S * 5/1994 Schulz et al. ..... D15/14
5,361,568 A * 11/1994 Lin ..... 56/202
D356,581 S * 3/1995 Chunn et al. ..... D15/14
D381,665 S * 7/1997 Hinklin et al. ..... D15/14
5,910,091 A * 6/1999 Iida et al. ..... 56/17.5
6,018,937 A * 2/2000 Shimada et al. ..... 56/10.5
D424,070 S * 5/2000 Danthois ..... D15/14

* cited by examiner

*Primary Examiner*—Mitchell Siegel
(74) *Attorney, Agent, or Firm*—Harness, Dickey & Pierce, P.L.C.

(57) CLAIM

The ornamental design for a lawn mower, as shown and described.

DESCRIPTION

FIG. 1 is a front perspective view of a lawn mower taken from the front and one side;
FIG. 2 is a top view thereof;
FIG. 3 is a side elevational view thereof, taken from the side illustrated in FIG. 1;
FIG. 4 is a side elevational view thereof, [take] *taken* from the side opposite that illustrated in FIG. 1.
FIG. 5 is a front elevational view thereof; and,
FIG. 6 is a rear elevational view thereof.
The views not shown do not constitute part of the claimed design.
It will be understood that the broken lines shown throughout the drawings are for illustrative purposes only and form no part of the subject invention.

1 Claim, 6 Drawing Sheets

Figure 1:
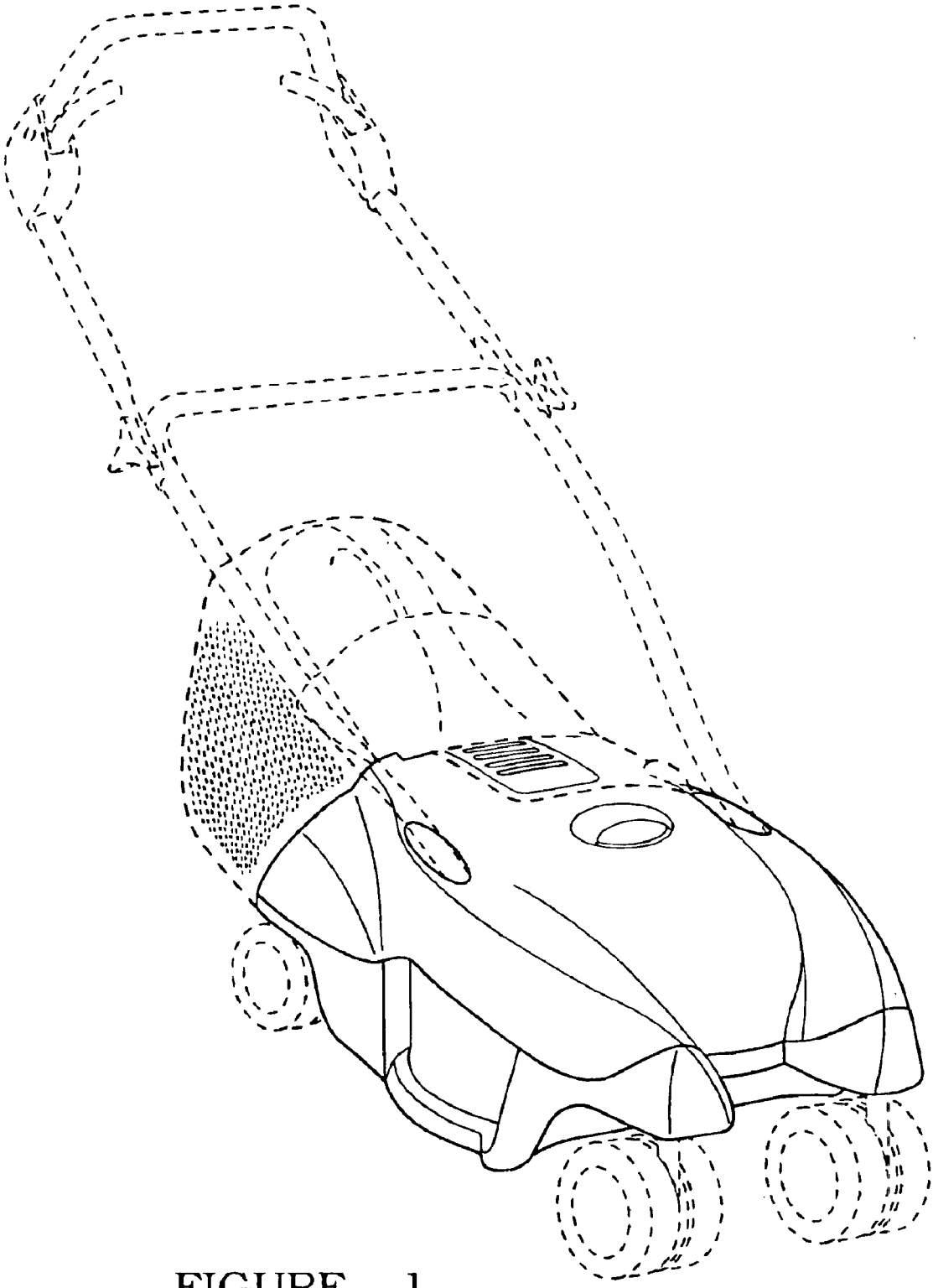
Figure 2:
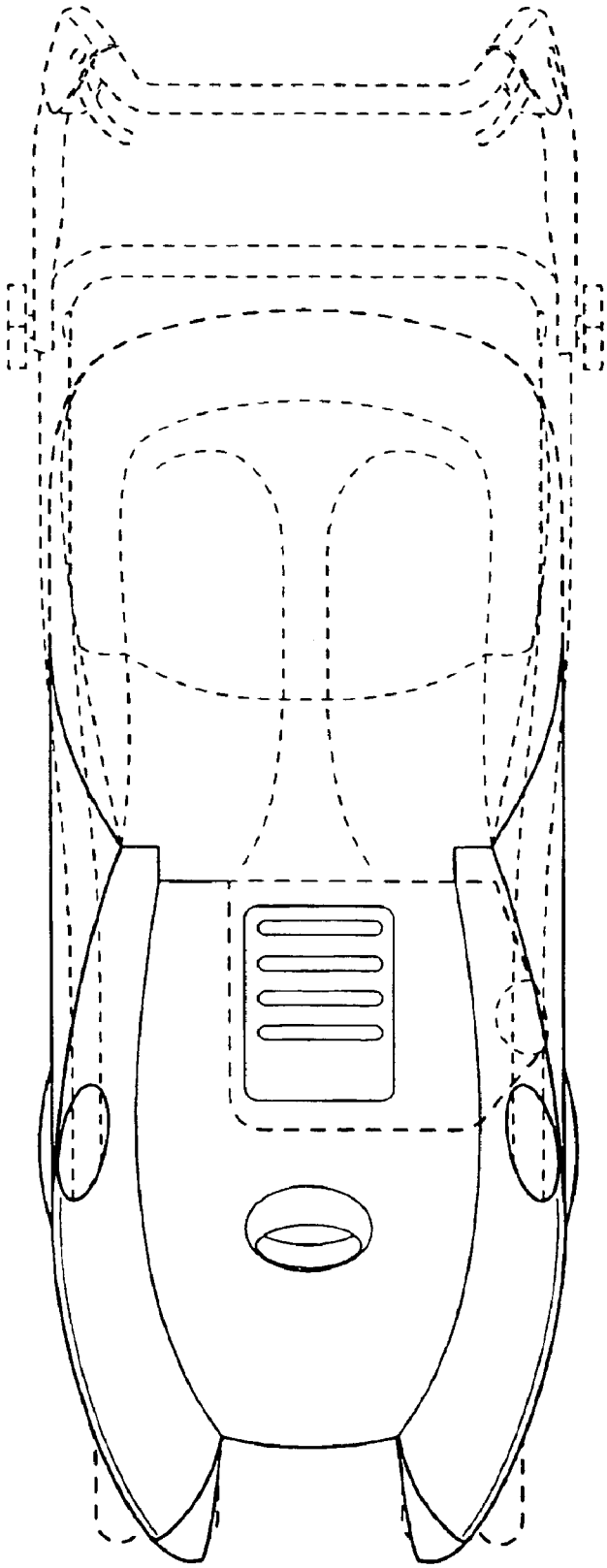
Figure 3:
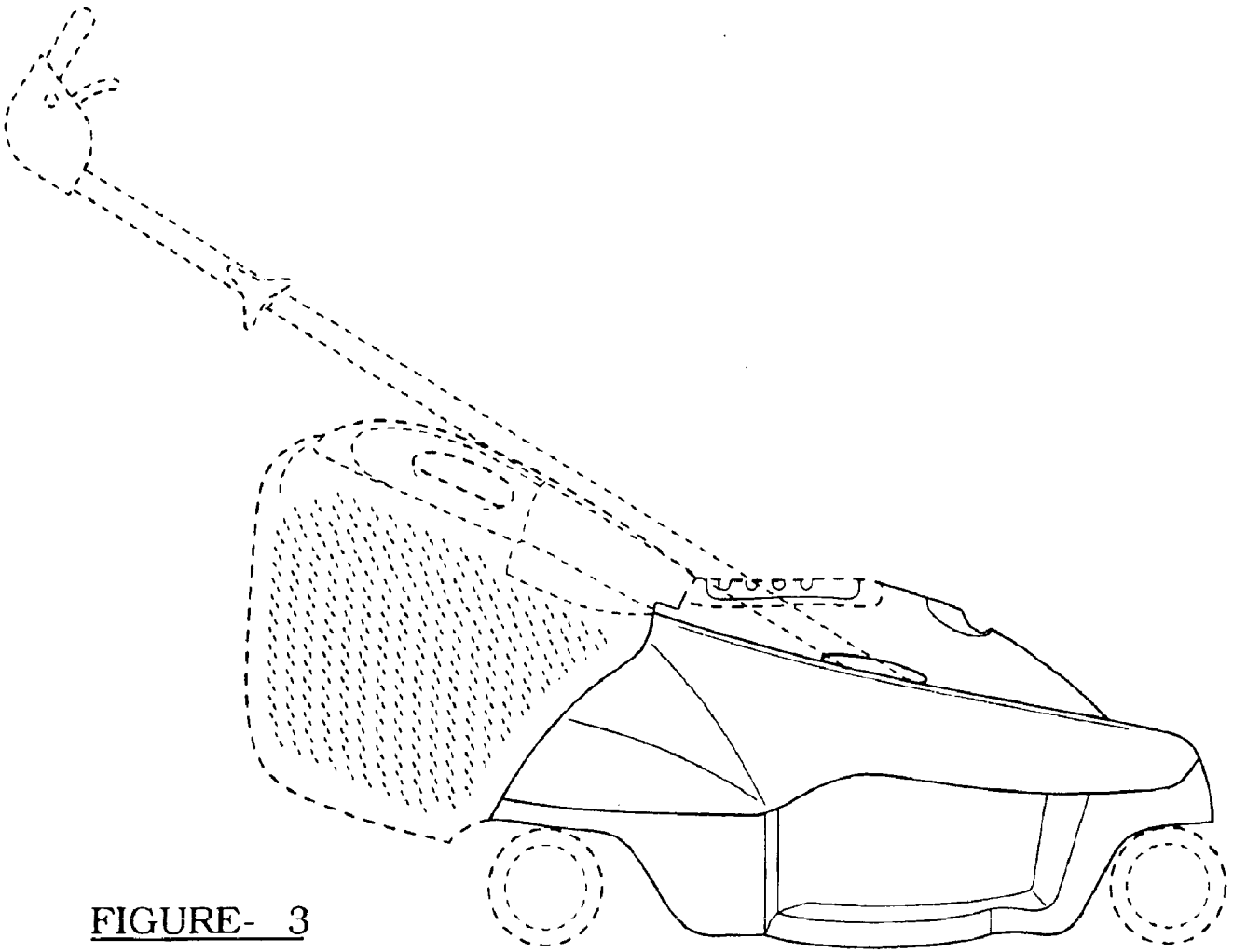
Figure 4:
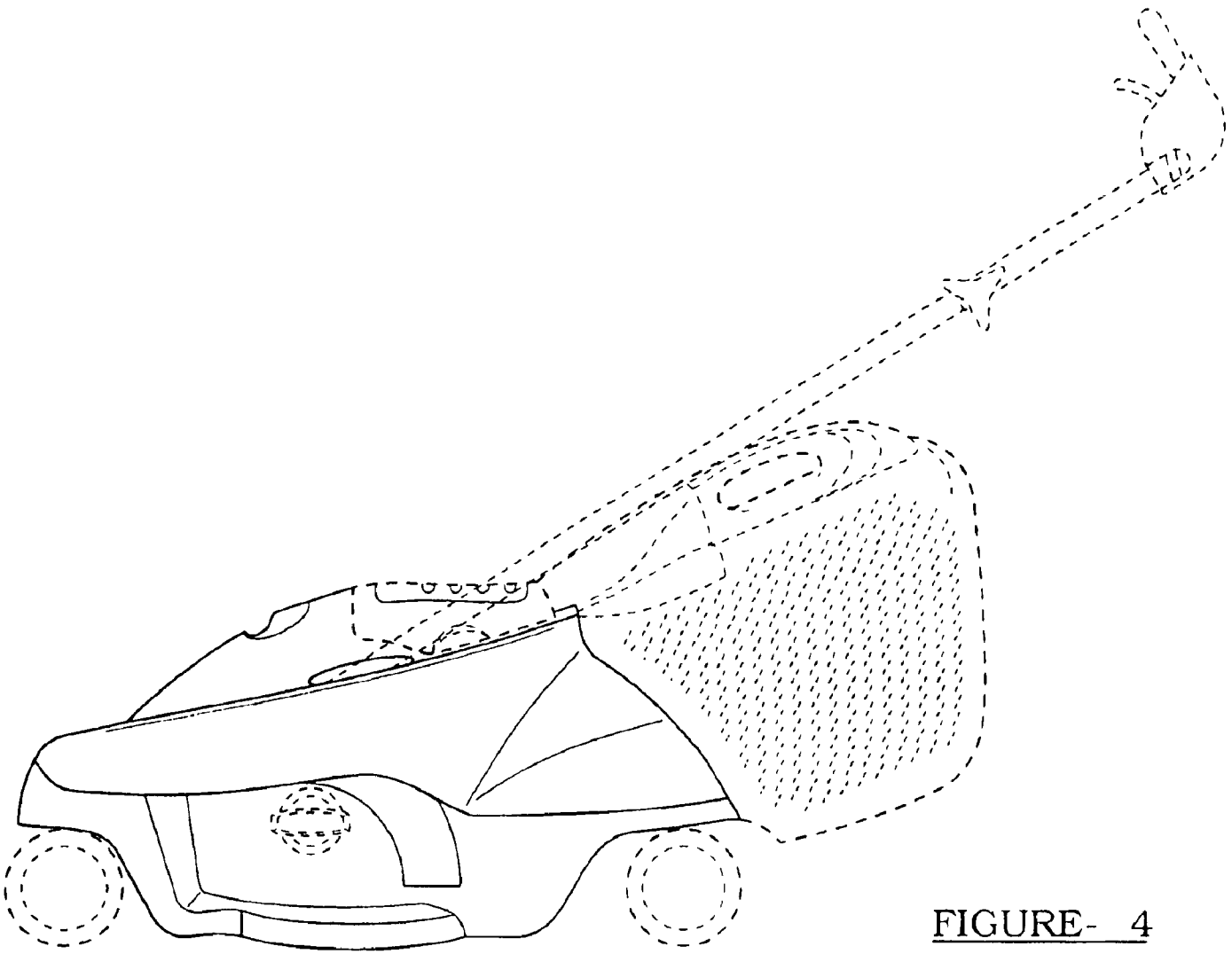
Figure 5:
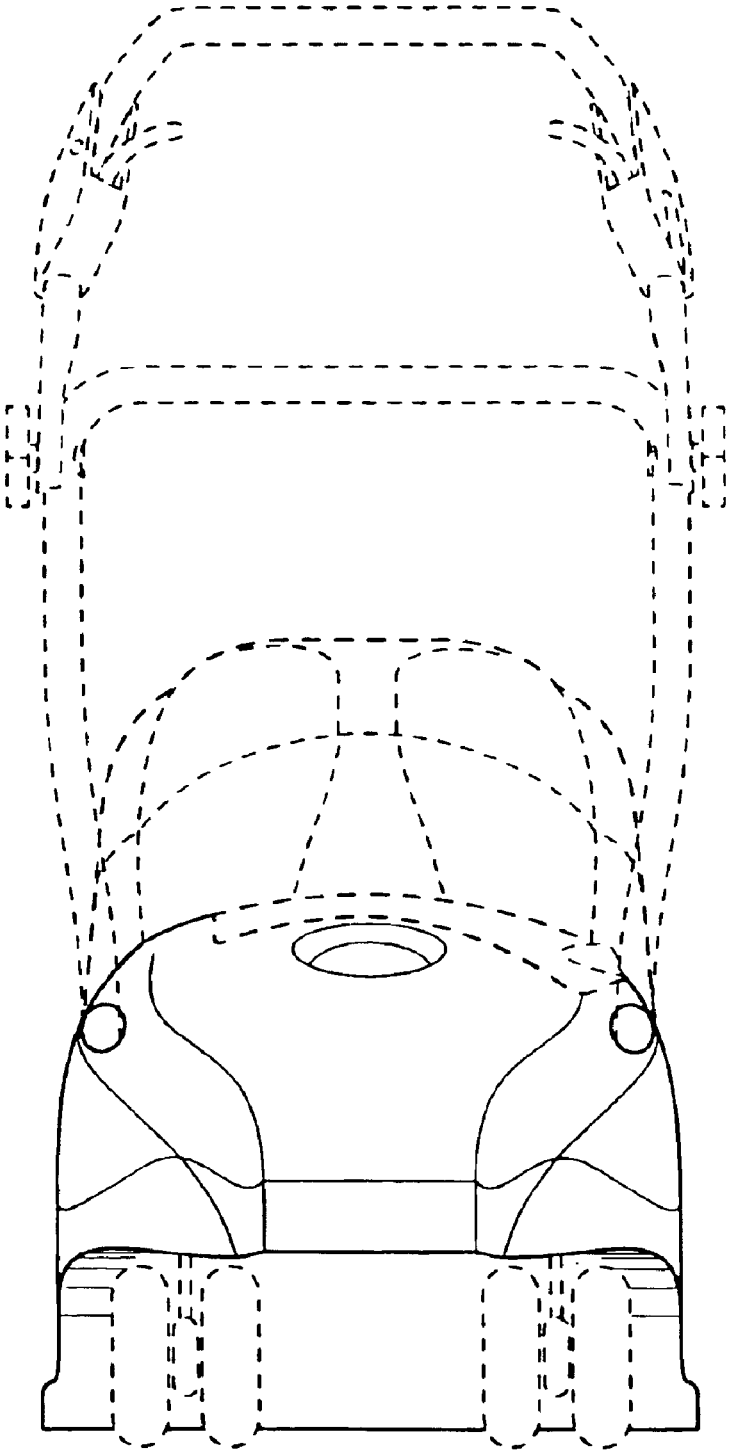
Figure 6:
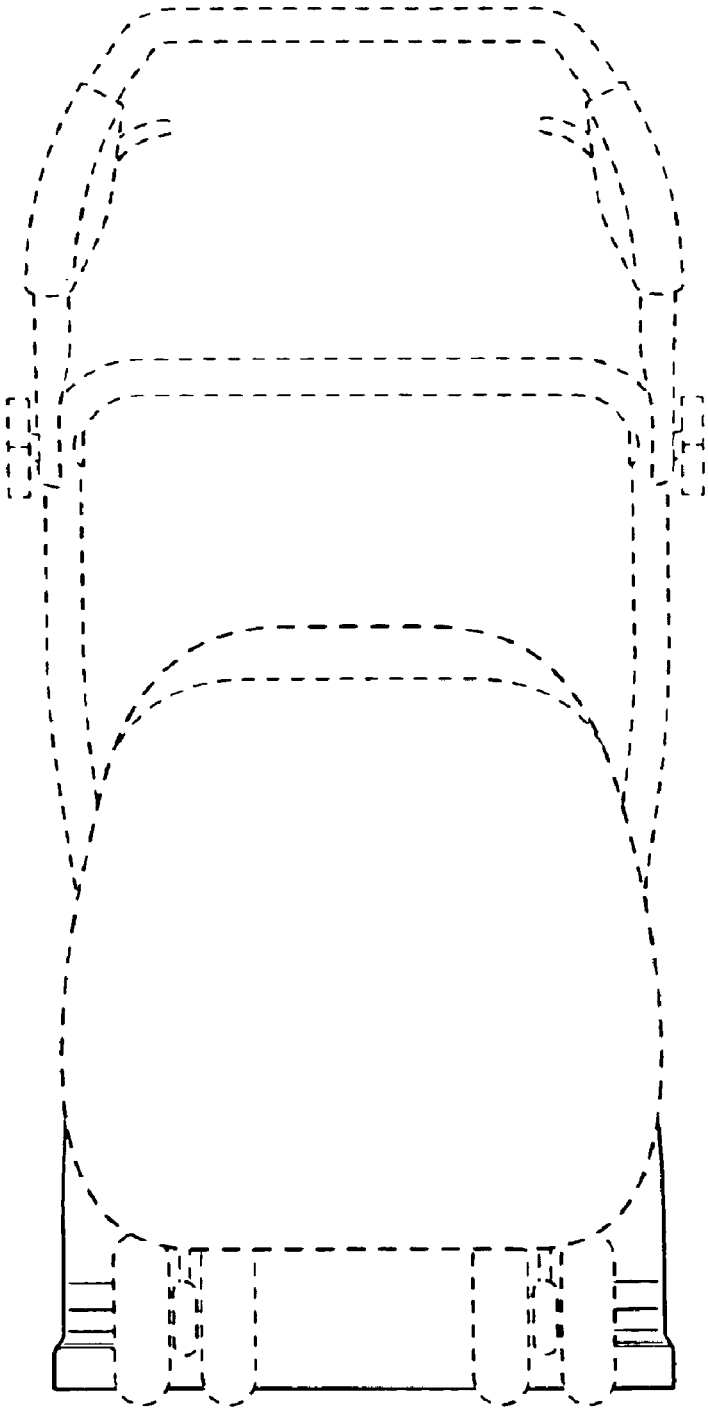

Matter enclosed in heavy brackets [ ] appears in the original patent, but forms no part of this reissue; matter printed in italics indicates the additions made by reissue.